United States Patent [19]

Lim et al.

[11] Patent Number: 5,142,365
[45] Date of Patent: Aug. 25, 1992

[54] CIRCUIT FOR CONTROLLING CONTRAST IN A DIGITAL TELEVISION RECEIVER

[75] Inventors: Jong-Sang Lim, Suwon; Dae-Yoon Shim, Seoul, both of Rep. of Korea

[73] Assignee: Samsung Electronics Co., Ltd., Suweon, Rep. of Korea

[21] Appl. No.: 575,664

[22] Filed: Aug. 31, 1990

[30] Foreign Application Priority Data

Sep. 1, 1989 [KR] Rep. of Korea ............... 1989-12654

[51] Int. Cl.$^5$ ............................................. H04N 5/57
[52] U.S. Cl. .................................. 358/169; 358/168; 358/176
[58] Field of Search ............... 358/168, 169, 176, 166

[56] References Cited

U.S. PATENT DOCUMENTS

| | | | |
|---|---|---|---|
| 4,121,252 | 10/1978 | Saiki | 358/169 |
| 4,126,884 | 11/1978 | Shanley | 358/169 |
| 4,682,231 | 7/1987 | Yamakawa | 358/169 |
| 4,979,044 | 12/1990 | Hong | 358/169 |
| 4,982,287 | 1/1991 | Lagoni | 358/169 |

Primary Examiner—James J. Groody
Assistant Examiner—Sherrie Hsia
Attorney, Agent, or Firm—Robert E. Bushnell

[57] ABSTRACT

A circuit for controlling contrast signal is disclosed. The circuit processes contrast signal separately from the original composite video signal and then the pedestal level of the contrast signal is converted to be at zero level. Thereafter, such processed contrast signal is mixed with the original composite video signal. In structure, the contrast control circuit includes: a color/brightness signal separator for separating color signal and brightness signal from said digital composite video signal; a level converter for converting pedestal level of the brightness signal to be at zero level; a gain controller for controlling the output gain of the level converter; a delay controller for delaying the brightness signal output from the color/brightness signal separator; a mixer for mixing the outputs of the delay controller and the gain controller; and an overflow detection and output section for detecting an overflow from the output of said mixer so that if the overflow is detected, the overflow detection value is restricted to a maximum value.

17 Claims, 4 Drawing Sheets

CIRCUIT FOR CONTROLLING CONTRAST IN A DIGITAL TELEVISION RECEIVER

BACKGROUND OF THE INVENTION

This invention relates to a circuit and a method for controlling the contrast in a digital television receiver, in which the level of a composite video signal is converted such that a pedestal value of the composite video signal has a zero level.

In general, the contrast control in a digital television receiver refers to controlling the shading (or brightness) of picture on a screen. In a general analog television receiver, there is proposed a method commonly used for converting the amplitude of the brightness signal by means of adding or subtracting the gain of the image signal component provided from an image amplifier. As far as, however, a digital television receiver which is widely researched nowadays is concerned, it is necessarily demanded that the contrast control against a video signal converted into digital signal should be carried out proportionally with respect to the amplitude change of an original composite video signal, and further it should be the composite video signal.

The digitalized signal of the video composite signal is in general related to the bit number of an analog-digital (A/D) converter employed to a digital contrast circuit. As illustrated in FIG. 1, the signal output of the A/D converter is binarilly processed to have top value 101 and bottom value 104, dividing the interval between the top value 101 and bottom value 104 into given levels of n-bit data (in case of n-bit A/D converter). For instance, in a digital contrast circuit employing a 4-bit A/D converter, the top value 101 will be of binary 1111 and the bottom value 104 will be of binary 0000 in the straight code. Furthermore, the 2's complement values of each the above values are respectively 00001 for the top value 101 and 1000 for the bottom value 104.

In addition, the value of the intermediate level 102 can be described in a given digital value. For example, if the straight code of the n-bit intermediate value 102 is of 1000, then the 2's complement code corresponding thereto will be of 1000.

In this case, a signal portion 107 of brightness signal component of the composite video signal 105, relating to the contrast control, is placed between the pedestal level 103 of the composite video signal 105 and the peak value 106 of the composite video signal. In other words, the brightness signal component relating to the contrast control is a signal portion of the composite video signal excluding the synchronous signal component and the pedestal level 103. Namely, it is the signal between the pedestal level 103 and the top value 101.

If a method of multiplying the gain of the contrast signal for the entire composite video signal, without using the above mentioned method, is used for controlling the contrast signal, then the level of the synchronous signal and pedestal signal component are also multiplied with a same ratio as the contrast signal component, which causes the distortion of the composite video signal. FIG. 2B shows distortion of the composite video signal against the original composite video signal of FIG. 2A.

Of the distorted composite video signals illustrated in the drawings, distortion of the synchronous signal component may be avoided by suppressing the multiplication during the synchronous signal by means of a control gate. Nevertheless, the distortion of the DC component of the pedestal level 103 can not be avoided. Accordingly, it is in a great necessity to stabilize the pedestal signal level excluding the distortion of the original composite video signals, controlling independently only the signal component relating to the contrast signals.

SUMMARY OF THE INVENTION

It is accordingly an object of the present invention to provide a circuit for selectively processing only the contrast signal component of a composite video signal and a method for the same.

It is another object of the present invention to provide a circuit for mixing the processed contrast signal with the original composite video signal, thereby to provide the distortionless video signal.

According to an aspect of the present invention, a circuit for controlling the contrast signal includes: an analog-digital converter for converting analog composite video signal input into digital composite video signal; a color/brightness signal separator coupled to the analog-digital converter, for separating color signal and brightness signal from the digital composite video signal; a level converter coupled to the color/brightness signal separator, for converting pedestal level of the brightness signal to be at zero level, in response to a reference value applied thereto through a reference pedestal level terminal; a gain controller for controlling the output gain of the level converter in response to a gain control value input; a delay controller for delaying by a predetermined time the brightness signal output from the color/brightness signal separator; a mixer for mixing the outputs of the delay controller and the gain controller in response to a synchronous signal; and an overflow detecting and outputting means for detecting an overflow from the output of the mixer so that if the overflow is detected, the overflow detection value is restricted to a maximum value.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

The preferred embodiment taken according to the principle of the present invention will now be described in detail with reference to the drawings attached hereto only by way of an example.

Figure 3:
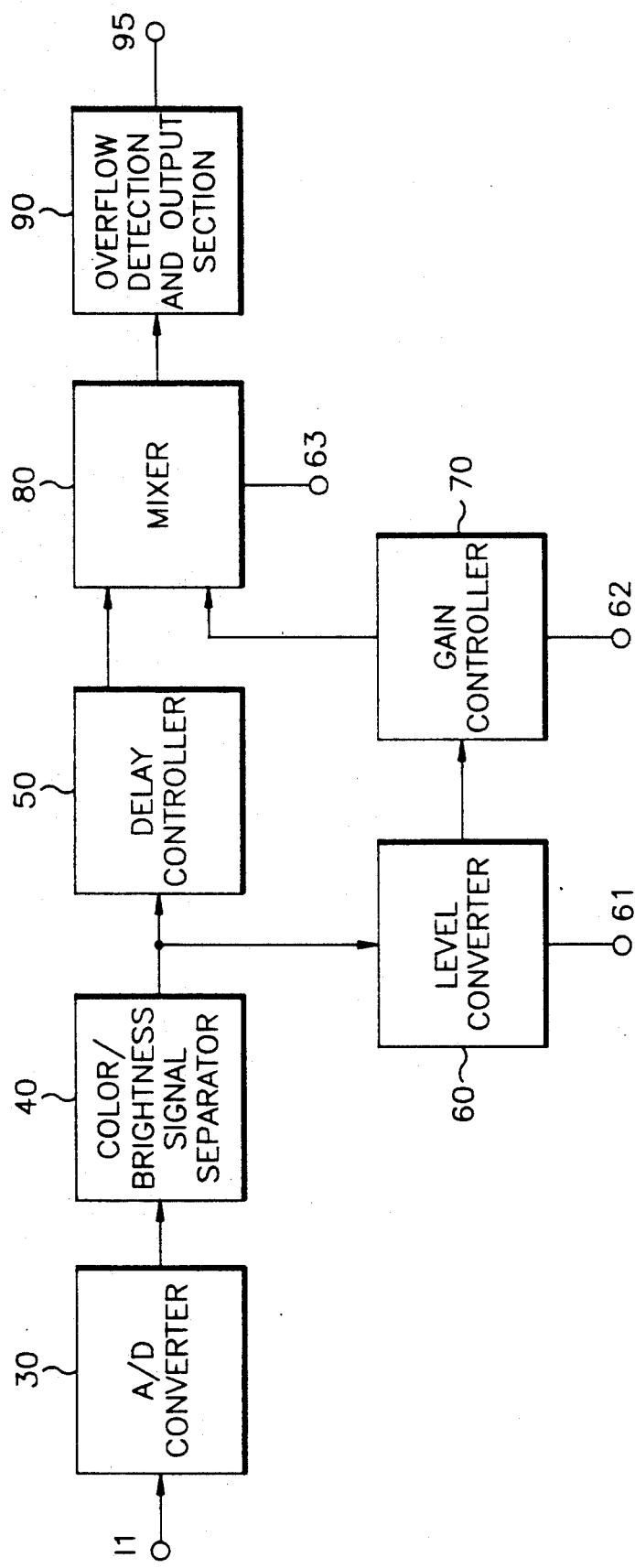
FIG. 3 shows a system block diagram of a circuit for controlling the contrast signal according to the present invention.

Referring to FIG. 3, an A/D converter 30 converts analog video composite signals provided through an input terminal I1 thereof into digital signals of n-bit composite video signal to provide the converted digital signals to a color/brightness signal separator 40. Then, the color/brightness signal separator 40 receiving the output of the A/D converter 30 separates the color signal and brightness signal from the digital composite video signal. In addition, the brightness signal output from the color/brightness signal separator 40 is converted by a level converter 60 such that the pedestal level of the composite video signal is to be zero level according to a reference value input from a reference pedestal level terminal 61. The converted signal output is applied to a gain controller 70 which controls the gain of the signal input according to a gain thereof. In the mean time, the brightness signal output from the color/brightness signal separator 40 is delayed by a predetermined time by a delay controller 50 so as to match the brightness signal with the signal processed by the level converter 60 and the gain controller 70.

Thus, the outputs of the delay controller 50 and the gain controller 70 are mixed by a mixer 80 according to a synchronous signal provided from a synchronous signal input terminal 63. The mixed signal will be applied to a overflow detection and output section 90 to detect overflow and restrict the detected value to a maximum value, thereby providing the brightness signals free of distortion.

Figure 4:
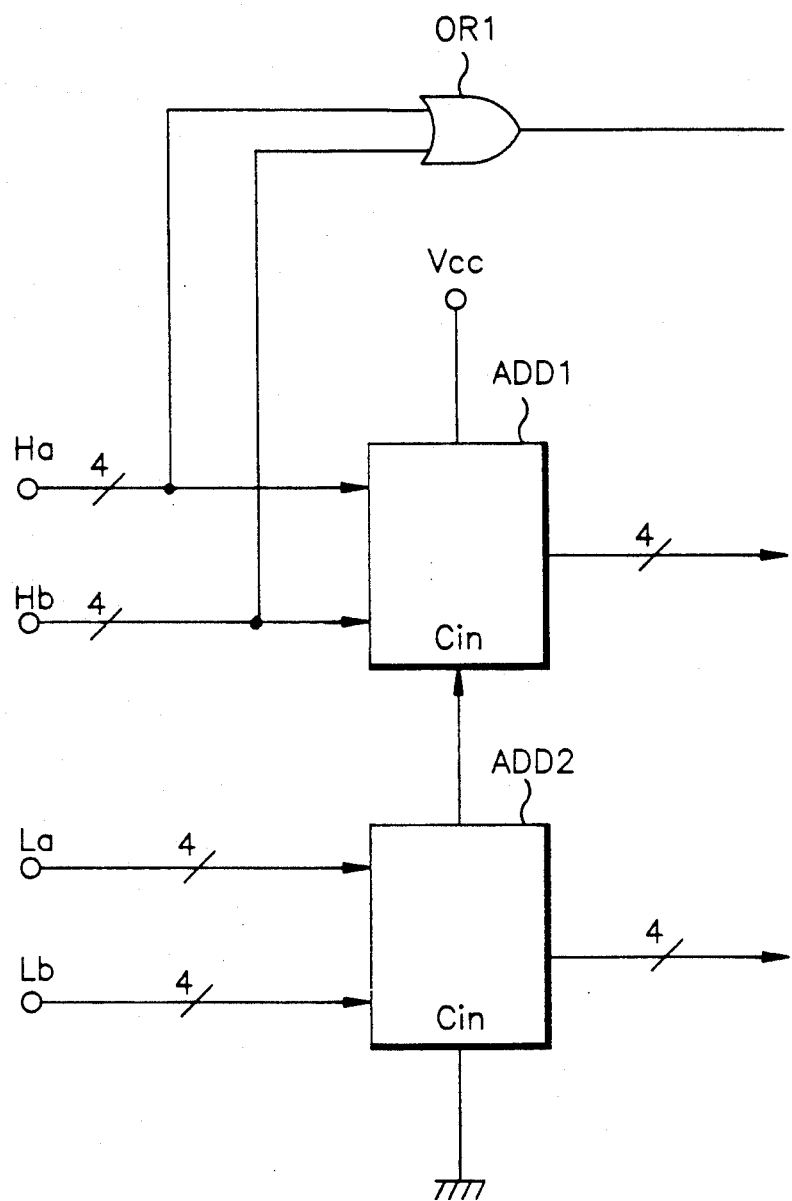
FIG. 4 shows a detailed circuit diagram of a level converter in FIG. 3 according to the present invention.

Referring to FIG. 4, there is illustrated a detailed circuit diagram of the level converter 60 of FIG. 3 which employs the 2's complement code system. In the drawing, it is shown that, of a first through a fourth input terminals $H_a$, $H_b$, $L_a$, $L_b$ of a first and a second adders $ADD_1$, $ADD_2$, the first and the third input terminals $H_a$, $L_a$ are coupled to the output of the color/brightness signal separator 40 to receive the brightness signal, and the second and the fourth input terminals $H_b$, $L_b$ thereof are coupled to the reference pedestal levels terminal 61 to receive the reference data input. The signals applied to the first and the second adders $ADD_1$, $ADD_2$ are added together and the most significant bits (MSB) of the first and the second input terminals $H_a$, $H_b$ are respectively applied to an OR gate $OR_1$ so as to obtain a sign bit of them.

Figure 5:
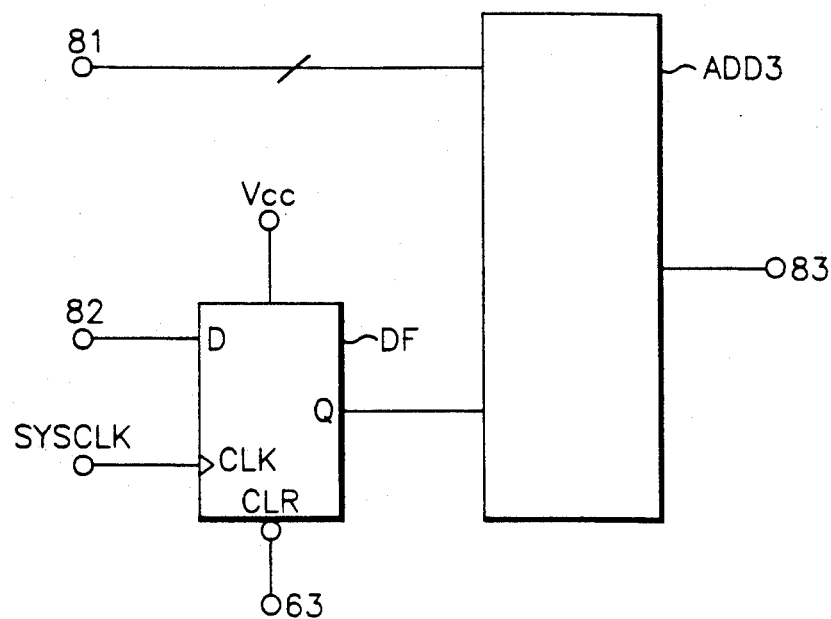
FIG. 5 shows a detailed circuit diagram of a mixer in FIG. 3 according to the present invention.

Referring to FIG. 5, it shows a detailed circuit diagram of the mixer 80 of FIG. 3, in which a data input terminal D of a D-type flip-flop DF is coupled to the output terminal 82 of the gain controller 70, a synchronous signal input terminal 63 is coupled to a clear terminal of the D-type flip-flop DF, and the output terminal Q of the D-type flip-flop DF and the output terminal 81 of the delay controller 50 are respectively coupled to the different input terminals of a third adder $ADD_3$.

Figure 6:
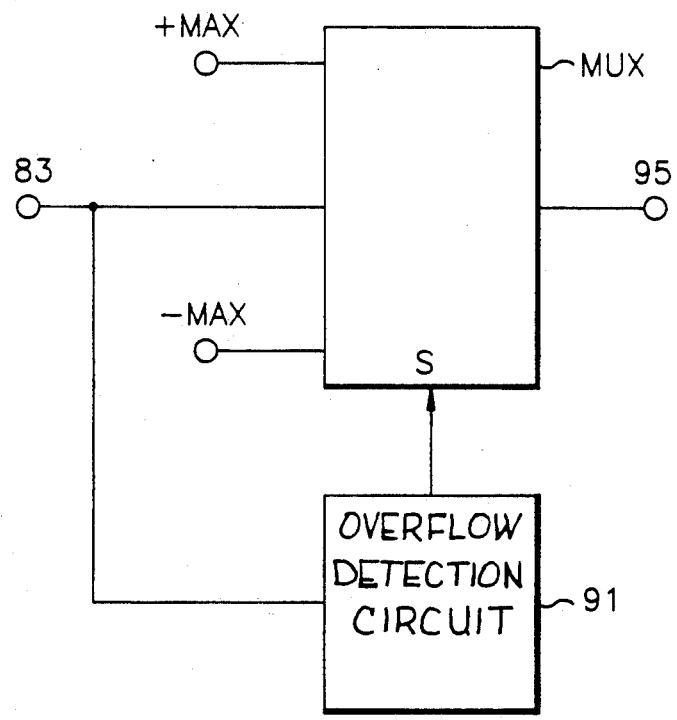
FIG. 6 shows a detailed circuit diagram of an overflow detection and output section in FIG. 3 according to the present invention.

Referring to FIG. 6, it shows a detailed circuit diagram of the overflow detection and output section 90 of FIG. 3, in which input terminals of a multiplexer MUX and an overflow detection circuit 91 are commonly coupled to the output terminal 83 of the mixer 80, the output of the overflow detection circuit 91 is coupled to a selection terminal S of the multiplexer MUX, and the maximum and minimum input terminals +MAX, −MAX of the multiplexer MUX are respectively controlled to have predetermined values.

Figure 1:
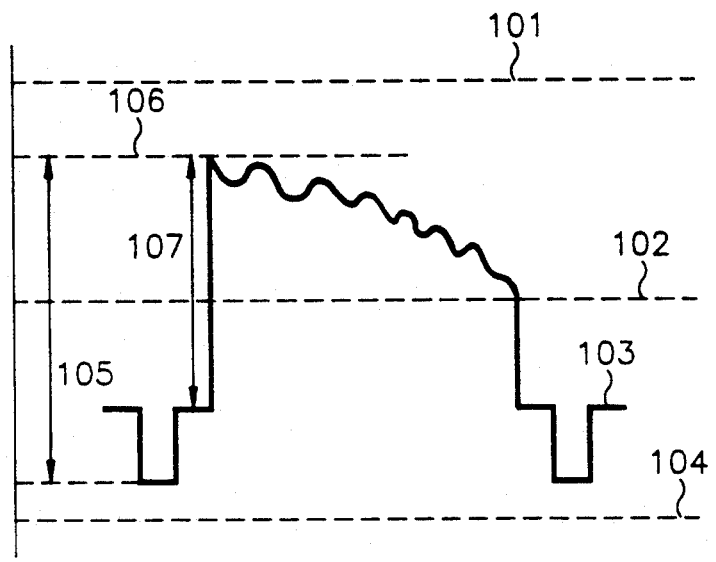
FIG. 1 shows a waveform of general composite video signals.
Figures 2A, 2B:
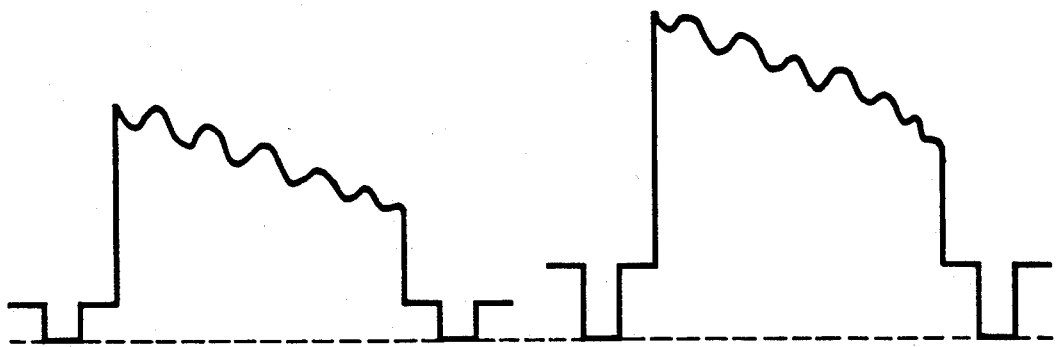
FIG. 2A and 2B show waveforms for explaining the distortion of the composite video signals.

Now referring to FIGS. 1 through 6, the preferred embodiment will be described in detail, in view of the operation. First of all, the composite video signal input in the form of FIG. 1 is digitalized by the A/D converter 30. As mentioned before, in the relation between the analog composite video signal and the digitalized composite video signal, only the value between the pedestal level 103 and the top level 101 is concerned with controlling the contrast of the composite video signal. As usual, in digital signal processing, amplification of a signal is implemented by multiplication, during which distortion of the composite video signal may occur. In order to avoid distortion of the video signal, it is necessary that the pedestal level should be excluded from the multiplication of the video signal.

In general, when the digital brightness signal is separated by the color/brightness signal separator 40 after digitalized by the A/D converter 30, the pedestal level will have a specific level higher or lower than zero level. Therefore, as well shown in FIGS. 2A and 2B, if the video signal is multiplied by a given gain value, the pedestal level will also change causing the distortion of the video signal. Accordingly, it is demanded that a level movement for the current pedestal value should be made so as to change the current pedestal level to the zero level (i.e., 0000 in digital data).

In order to accomplish the above level movement, the brightness signal of the composite video signal from the color/brightness signal separator 40 is applied into the level converter 60 so as to convert its level. Namely, the brightness signals of four bits separated by the color/brightness signal separator 40 are applied to the first and the third input terminals $H_a$, $L_a$ of the first and the second adders $ADD_1$, $ADD_2$ and the reference values of four bits are applied to the second and the fourth terminal $H_b$, $L_b$ which are the reference pedestal level terminals 61, respectively. Thus, the signal inputs are added according to the status of the carry terminal thereof to change the pedestal level to zero level. In the mean time, the most significant bits of the signals on the first and the second input terminals $H_a$, $H_b$ are provided to the OR gate $OR_1$ to determine the sign.

If the composite video signal is centered on the intermediate level 102 in 2's complement code as shown in FIG. 1, the pedestal level 103 will have a "−" value. In this case, the pedestal level can be moved to zero level by adding a specific value to the entire composite video signal. If the level movement value of the level converter 60 is applied to the gain controller 70, then the gain controller 70 will multiply the input value by the gain at a gain control valve terminal 2 so that only the amplitude of the contrast signal component is changed, keeping the pedestal value into zero level.

The outputs of the gain controller 70 and the delay controller 50 are applied to the mixer 80, in which the brightness signal, which is separated by the color/brightness signal separator 40, by using a plurality of delays which are implemented by the D-type flip-flops.

The mixer 80, as illustrated in FIG. 5, is such constructed that the output of the delay controller 50 is applied to the third adder $ADD_3$ and the output of the gain controller 70 is applied to the data input terminal D of the D-type flip-flop DF, so that the outputs of the delay controller 50 and the gain controller 70 are latched in response to the clock pulse from the system clock terminal SYS-CLK. In addition, the D-type flip-flop DF is cleared according to the synchronous signal input from the synchronous signal input terminal 63 and the output of the D-type flip-flop DF is applied to an input terminal of the third adder $ADD_3$ to be added to the output of the delay controller 50. Such processed data output of the third adder $ADD_3$ is applied to the overflow detection and output section 90.

The overflow detection and output section 90 is constructed as illustrated in FIG. 6, in which a overflow detection circuit 91 detects an overflow generated from the output of the mixer 80 and, at the same time, the output of the mixer 80 is applied to the multiplexer MUX. The multiplexer MUX is controlled under the detection signal output of the overflow detection circuit 91 to select the maximum value, minimum value, or normal output.

Namely, the contrast signal processed through the level converter 60 and the gain controller 70 and the contrast signal delayed by the delay controller 50 are mixed (added) at the mixer 80 so that the resultant contrast signal is controlled to have an amplitude between 0 and +2. Furthermore, in order to secure the synchronous signal, the D-type flip-flop DF produces zero value while the contrast signal is mixed with the gating pulse input, which is generated in a given time interval through the terminal 63 so that at this time only the contrast signal may pass through. In the mean time, from such mixed signal, the signal portion with the overflow is limited at the overflow circuit 91 as the maximum value. Therefore, the contrast signal can be properly controlled avoiding the distortion of the composite video signal.

As described heretofore, according to this invention, the contrast signal is processed separately from the original composite video signal and the pedestal level of the contrast signal is converted to be at zero level. Thereafter, such processed contrast signal is mixed with the original composite video signal. It is therefore an advantage of the invention that the distortion of the composite video signal is minimized and the characteristic of the contrast control is enhanced.

While the invention has been particularly shown and described with reference to a preferred embodiment, it will be understood by those skilled in the art that modifications in of the invention.

What is claimed is:

1. A circuit for controlling image contrast in a digital television receiver, comprising:
   analog-digital converter means for converting an analog composite video signal input into a digital composite video signal;
   color/brightness signal separator means coupled to said analog-digital converter means, for separating a color signal and a brightness signal from said digital composite video signal;
   level converter means coupled to said color/brightness signal separator means, for converting a pedestal level of said brightness signal to a zero level, in response to a reference value applied at a reference pedestal level terminal;
   gain controller means for controlling the output gain of said level converter means in response to a gain control value;
   a delay controller means for delaying said brightness signal output from said color/brightness signal separator means by a predetermined time;
   mixer means for mixing the outputs of said delay controller means and said gain controller means in response to a synchronous signal; and
   overflow detector means for detecting an overflow from the output of said mixer means so that if the overflow is detected, the overflow detection value is restricted to a maximum value.

2. A circuit as claimed in claim 1, wherein said level converter means comprises:
   first adder means having at least two input terminals for receiving said brightness signal output of said color/brightness signal separator means and a reference pedestal value, and for adding the signals applied to said at least two input terminals in response to a carry signal;
   second adder means having at least two input terminals for receiving said brightness signal output from said color/brightness signal separator means and said reference pedestal value, and for adding the input signals applied to said two input terminals for generating said carry signal; and
   means coupled so as to compare the respective most significant bits of the signals applied through the two input terminals of said first adder, for determining a sign indicative of positive or negative of said brightness with reference to said reference pedestal value.

3. A circuit as claimed in claim 2, wherein said mixer means comprises:
   flip-flop means connected to said gain controller means for providing the output of said gain controller means in response to a system clock signal; and
   adder means connected to said flip/flop means and said delay controller means for adding the outputs of said flip-flop means and said delay controller means.

4. A circuit as claimed in claim 3, wherein said overflow detector means comprises:
   overflow detection means coupled for detecting an overflow generated from the output of said mixer means to produce an overflow signal; and
   means for restricting the signal output of said mixer means to a maximum value in response to said overflow signal.

5. A circuit as claimed in claim 1, wherein said level converter means comprises:
   first and second adders, each having to two input terminals for receiving said brightness signal output from said color/brightness signal separator means and a reference pedestal value applied through a reference terminal, for adding the input signals applied to said two input terminals of said first and second adders; and
   means coupled so as to compare the respective most significant bits of said brightness signal and said reference pedestal valve for determining a sign of the difference therebetween.

6. A circuit as claimed in claim 3, wherein said system clock signal acts as a gating signal of a predetermined time interval to allow only said brightness signal to pass through said flip-flop means for adding with the output of said delay controller means.

7. A circuit for controlling image contrast in a digital television receiver, comprising:
   color/brightness signal separator means for separating a color signal and a brightness signal from a composite video signal;
   level converter means coupled to said color/brightness signal separator means for converting a pedestal level of said brightness signal to a zero level in accordance with a reference pedestal value applied to said level converter means;
   gain controller means for controlling the output gain of said level converter means in accordance with a gain control valve.
   delay controller means delaying said brightness signal separated from said color/brightness signal separator means.

mixer means for mixing the outputs of said delay controller means and said gain controller means in response to a synchronous signal; and overflow detector means for detecting an overflow from the output of said mixer means so that if said mixer means output exceeds an overflow value, said output is restricted to a maximum value.

8. A circuit as claimed in claim 7, wherein said level converter means comprises:

input terminals for receiving said brightness signal output from said color/brightness signal separator means and said reference pedestal value;

means for combining said brightness signal and said reference pedestal value;

comparator means coupled to said input terminals for comparing the respective most significant bits of said brightness signal and said reference pedestal value for determining a sign of the difference therebetween.

9. A circuit as claimed in claim 8, wherein said level converter means further comprise:

a first adder for adding the most significant bits of said brightness signal and said reference pedestal value;

a second adder for adding the least significant bits of said brightness signal and said reference pedestal value; and combining means for adding the output of said first and second adders.

10. A circuit as claimed in claim 8, wherein said level converter means further comprises:

means for determining the direction for movement of the pedestal level of said brightness signal toward a zero level based on said determined sign.

11. A circuit as claimed in claim 8, wherein said comparator means includes an OR gate.

12. A circuit as claimed in claim 7, wherein said overflow detector means comprises:

overflow detection means coupled for detecting the output from said mixer means for producing a selection signal; and multiplexer means having a maximum value terminal, a minimum value terminal and a mixer input value terminal, a common output terminal and a selection terminal for receiving said selection signal for selecting the output signal of said circuit in response to said selection signal.

13. A circuit as claimed in claim 12, wherein said overflow detection means produces a maximum selection signal when said mixer means output exceeds an overflow value, so that said multiplexer means supplies a maximum value at said maximum value terminal as the output of said circuit.

14. A circuit as claimed in claim 12, wherein said overflow detection means produces a mixer selection signal when said mixer means output falls between said overflow value and a minimum value at said minimum value terminal, so that said multiplexer means supplies said minimum value as the output of said circuit.

15. A circuit as claimed in claim 12, wherein said overflow detection means produces a mixer selection signal when said means output falls equivalent to said overflow value, so that said multiplexer means supplies the input of said mixer means as the output of said circuit.

16. A method for controlling image contrast in a digital television receiver, comprising the steps of:

converting an analog video signal into a digital video signal;

separating said digital video signal into a color signal and a luminance signal having an image contrast information content representing by a first peak-to-peak amplitude level and an image brightness information content representing by a pedestal level;

receiving said luminance signal for suppressing said pedestal level of said luminance signal at a predetermined pedestal level to provide a first intermediate signal;

receiving said first intermediate signal for controlling a gain in said first peak-to-peak amplitude level to adjust an image contrast of said luminance signal using a reference gain control value to provide a second intermediate signal having a second peak-to-peak amplitude level different from said first peak-to-peak amplitude level and said pedestal level at said predetermined pedestal level;

delaying said luminance signal at a predetermined time interval to provide a third intermediate signal;

mixing said second intermediate signal and said third intermediate signal in accordance to a synchronous signal to provide a fourth intermediate signal having a third peak-to-peak amplitude level and said pedestal level at said predetermined pedestal level; and receiving said fourth intermediate signal for limiting said third peak-to-peak amplitude level within predetermined operating peak-to-peak amplitude levels to provide an image contrast control signal.

17. A method for controlling image contrast in a digital television receiver, comprising the steps of:

receiving video signals;

separating said video signals into a color signal and a luminance signal having an image contrast information content representing by a first peak-to-peak amplitude level and an image brightness information content representing by a pedestal level;

receiving said luminance signal for suppressing said pedestal level of said luminance signal at a predetermined pedestal level to provide a first intermediate signal;

receiving said first intermediate signal for controlling a gain in said first peak-to-peak amplitude level to adjust an image contrast of said luminance signal using a reference gain control value to provide a second intermediate signal having a second peak-to-peak amplitude level different from said first peak-to-peak amplitude level and said pedestal level at said predetermined pedestal level;

delaying said luminance signal at a predetermined time interval to provide a third intermediate signal;

mixing said second intermediate signal and said third intermediate signal in accordance to a synchronous signal to provide a fourth intermediate signal having a third peak-to-peak amplitude level and said pedestal level at said predetermined pedestal level; and receiving said fourth intermediate signal for limiting said third peak-to-peak amplitude level within predetermined operating peak-to-peak amplitude levels to provide an image contrast control signal.

* * * * *

UNITED STATES PATENT AND TRADEMARK OFFICE
CERTIFICATE OF CORRECTION

PATENT NO. : 5,142,365

DATED : August 25, 1992

INVENTOR(S) : Jong-Sang Lim, et al

It is certified that error appears in the above-identified patent and that said Letters Patent is hereby corrected as shown below:

Claim 2, Column 6, line 2, insert --input-- after "the".

Claim 7, Column 6, line 65, change "valve." to --value,--.
Column 6, line 68, change the period "." to a comma --,--.

Claim 9, Column 7, line 28, change "output" to --outputs--.

Signed and Sealed this

Twenty-first Day of September, 1993

Attest:

BRUCE LEHMAN

Attesting Officer     Commissioner of Patents and Trademarks